Spring & Boon,
Wood Planing Machine.

No 209. Reissued Jan. 13, 1852.

AM. PHOTO-LITHO. CO. N.Y. (OSBORNE'S PROCESS.)

UNITED STATES PATENT OFFICE.

CHARLES A. SPRING AND PETER BOON, OF KENSINGTON, PENNSYLVANIA.

IMPROVEMENT IN PLANING-MACHINES.

Specification forming part of Letters Patent No. 7,536, dated July 30, 1850; Reissue No. 209, dated January 13, 1852.

*To all whom it may concern:*

Be it known that we, CHARLES A. SPRING and PETER BOON, of Kensington, in the county of Philadelphia and State of Pennsylvania, have invented certain Improvements in Planing-Machines; and we do hereby declare that the following is a full, clear, and exact description of the principle or character which distinguishes therefrom all other things before known, and of the usual manner of making modifying, and using the same, reference being had to the accompanying drawing, of which—

Figure 1:
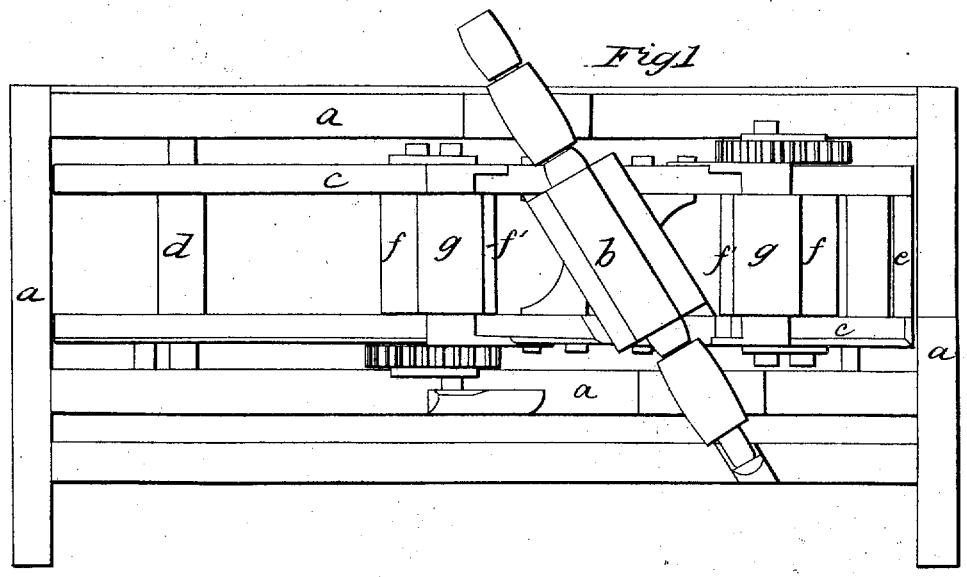
Figure 2:
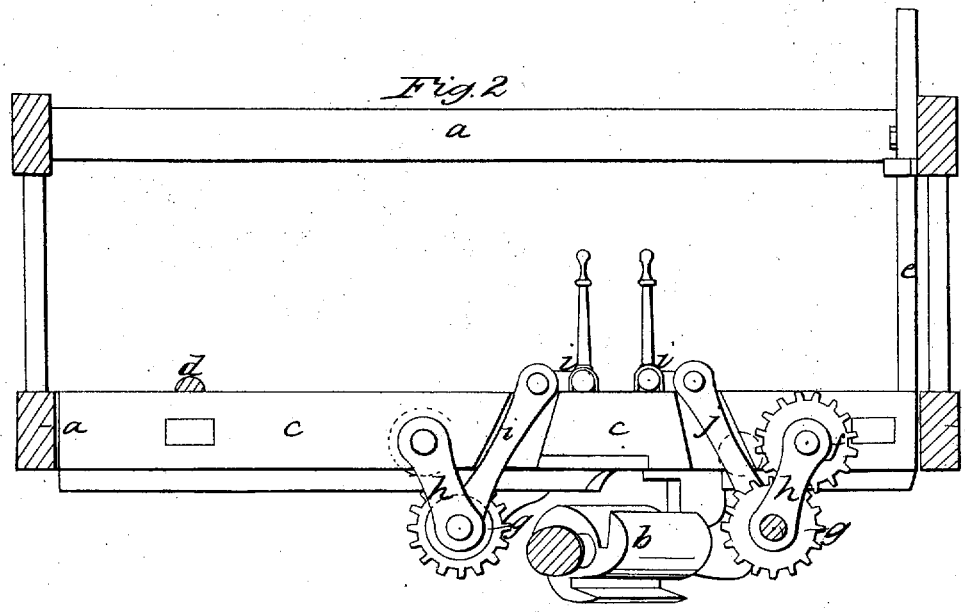

Figure 1 is a side elevation showing the position of the planing-cylinder; Fig. 2, a section showing the bed-piece and rollers.

The nature of our improvements consists in placing a cylinder of knives constructed on any of the most approved plans in an oblique position—say at an angle of forty-five degrees, more or less, the line of motion of the board through the machine.

We have found by practical experiment that by placing a cylinder of knives in an angular position, instead of placing it at right angles to the line of motion of the board, we greatly reduce the power required to drive the machine and to reduce and plane the board in a proper manner, beside which advantage we find that boards so planed are much smoother and more perfect than those planed when the cylinder is placed at right angles to the length of the board, as in the ordinary machines. The board also runs through the machine steadier, and does not require to be held down with so much care, the planing-cylinder having a greater tendency to steady the board when acting obliquely upon it than when at right angles. Also, in case of splinters in the surface of the board, they are not so likely to be torn out as when the knives act in the direction of their length.

We also construct the bed of the machine so that it may be moved to or from the knife, which allows it to be set to plane boards of any thickness, or to move it back from the planing-cylinder, if required, which is frequently of great advantage.

We also place in the movable bed two pairs of rollers, the pairs being kept together by links at their ends, which allow the upper roller to set more or less obliquely, according to the thickness of the board between them. The upper rollers are kept pressed on the board by weights or springs, which act on levers at the back of the bed-piece, joined to the ends of the rollers by links. The upper and lower rollers are made to turn in contrary directions by spur-wheels, and by their action force the board through the machine. Two other rollers are added, which serve to support the board nearer the planing-cylinder.

In the drawings, *a* is the frame of the machine, to which are fixed the bearings in which the journals of the oblique planing-cylinder *b* run. The bed-piece *c* is supported at one end by the cross-peice *d*, which works in bearings in the frame. The other end is attached to a sliding piece, *e*, which, together with the bed, is moved, by a lever or other contrivance, nearer or farther from the planing-cylinder.

The lower rollers, *f*, are jointed to the upper roller, *g*, by the links *h*. The rollers *g* are drawn down obliquely on the board by levers *i* and the links *j*, which are actuated by weights or springs applied to the tails of the levers *i*.

Having thus fully described our improved machine, we wish it to be understood we do not claim a bench that can be raised and lowered by set-screws or similar device; but

What we do claim as our invention is—

1. Hinging the bed-piece at one end and raising and lowering it at the other, in combination with the revolving cylindrical cutter, in the manner and for the purpose set forth.

2. The combination and moving of the feed-rollers *g* with the stationary ones by the oblique links and gear, as described, the whole being constructed and operating as above specified.

CHARLES A. SPRING.
PETER BOON.

Witnesses:
JOHN APPLE,
B. WILKENSON.